(12) United States Patent
Maille et al.

(10) Patent No.: US 7,336,281 B2
(45) Date of Patent: Feb. 26, 2008

(54) OPTIMIZING ERGONOMIC MOVEMENT OF A VIRTUAL DUMMY

(75) Inventors: Bruno Maille, Paris (FR); Edouard Ramstein, Melun (FR); Patrick Chedmail, La Chapelle sur Erdre (FR)

(73) Assignee: Snecma Moteurs, Paris (FR)

( * ) Notice: Subject to any disclaimer, the term of this patent is extended or adjusted under 35 U.S.C. 154(b) by 654 days.

(21) Appl. No.: 10/832,415

(22) Filed: Apr. 27, 2004

(65) Prior Publication Data

US 2004/0263531 A1    Dec. 30, 2004

(30) Foreign Application Priority Data

Apr. 28, 2003  (FR)  ................... 03 05193

(51) Int. Cl.
*G06T 13/00*  (2006.01)
(52) U.S. Cl. ..................................... 345/474
(58) Field of Classification Search ................ 345/651, 345/677, 474
See application file for complete search history.

(56) References Cited

U.S. PATENT DOCUMENTS 6,191,798 B1 *   2/2001  Handelman et al. ........ 345/473

OTHER PUBLICATIONS

Bruno Maille, et al. "Multi-Agent Approach and Emergence of a Virtual Human Behaviour in a VR Environment"; IEEE International Conference on Systems, Man, and Cybernetics; vol. 7 of 7; Oct. 6, 2002; 6 pgs.; XP010625598.

Patrick Chedmail, et al. "Accessibility and Ergonomics Study with Virtual Reality, a State of the Art", Mecanique & Industries, vol. 3, 2002, pp. 147-152, XP002267500.

V. Riffard, et al. "Optimal Posture of a Human Operator and CAD in Robotics"; Proceedings of the 1996 IEEE International Conference on Robotics and Automation; pp. 1199-1204; Apr. 22, 1996; XP010162908.

P. Chedmail, et al. "Robot Mechanism Synthesis and Genetic Algorithms"; Proceedings of the 1996 IEEE International Conference on Robotics and Automation; pp. 3466-3471; Apr. 22, 1996; XP010163264.

F. Bidault, et al. "A Distributed Approach for Access and Visibility Task Under Ergonomic Constraints with a Manikin in a Virtual Reality Environment"; IEEE International Workshop on Robot and Human Interactive Communication; pp. 32-37; Sep. 18, 2001; XP010576266.

* cited by examiner

*Primary Examiner*—Almis R. Jankus
(74) *Attorney, Agent, or Firm*—Oblon, Spivak, McClelland, Maier & Neustadt, P.C.

(57) ABSTRACT

A multi-agent method and system for moving a virtual dummy in a virtual environment, the dummy being defined by an overall position and by a plurality of degrees of freedom for joints. The method includes a contribution from an attraction agent acting on the plurality of degrees of freedom of the joints of the dummy to move the dummy towards the target; and a contribution from an avoider agent acting on the overall position of the dummy as a function of parameters defining the environment in order to avoid collisions between the dummy and said environment. The method further includes a contribution from an ergonomy agent acting on the plurality of degrees of freedom of the joints of the dummy in order to correct the posture of the dummy automatically while it is moving towards the target.

28 Claims, 6 Drawing Sheets

OPTIMIZING ERGONOMIC MOVEMENT OF A VIRTUAL DUMMY

FIELD OF THE INVENTION

The present invention relates to the field of stimulating the movement of a virtual dummy in a virtual environment. The invention relates more particularly to displacing a virtual dummy by using a multi-agent model.

BACKGROUND OF THE INVENTION

In numerous industries, in particular in the fields of aviation or space, use is often made of virtual reality models. For example, a digital model is often used to evaluate interference between different parts.

In like manner, modeling can be used to simulate human actions in a defined environment in order to visualize the movements that a technician will need to perform in order to undertake such actions, for example. This is useful for validating and optimizing accessibility to certain parts of a machine, such as an airplane engine, that require regular inspections and maintenance. Thus, ease of access to the various elements of a machine can be monitored virtually as soon as the elements have themselves been modelled, by using a simulation involving a virtual dummy.

The use of a virtual dummy in this type of application is already known. One example is given in an article by Chedmail, Damay, and Le Roy, entitled "Réalité virtuelle, maquette numérique du produit, outils de distribution et partage de la conception" [Virtual reality, digital model of the product, distribution tools, and sharing design] (Journees Primeca, La Plagne, Apr. 7-9, 1999).

That article proposes a method of validating accessibility for mounting/removing an object in a congested environment by using a model for displacing a virtual dummy in a virtual environment.

A virtual dummy is a digital data set defining a dynamic system characterized by a plurality of members jointed to one another with a plurality of degrees of freedom.

Thus, at a given instant, the dummy can be defined by its overall position in a metric space and by values for the degrees of freedom of the joints. This data together with the parameters defining the environment of the dummy can be stored on a digital data medium.

Figure 11:
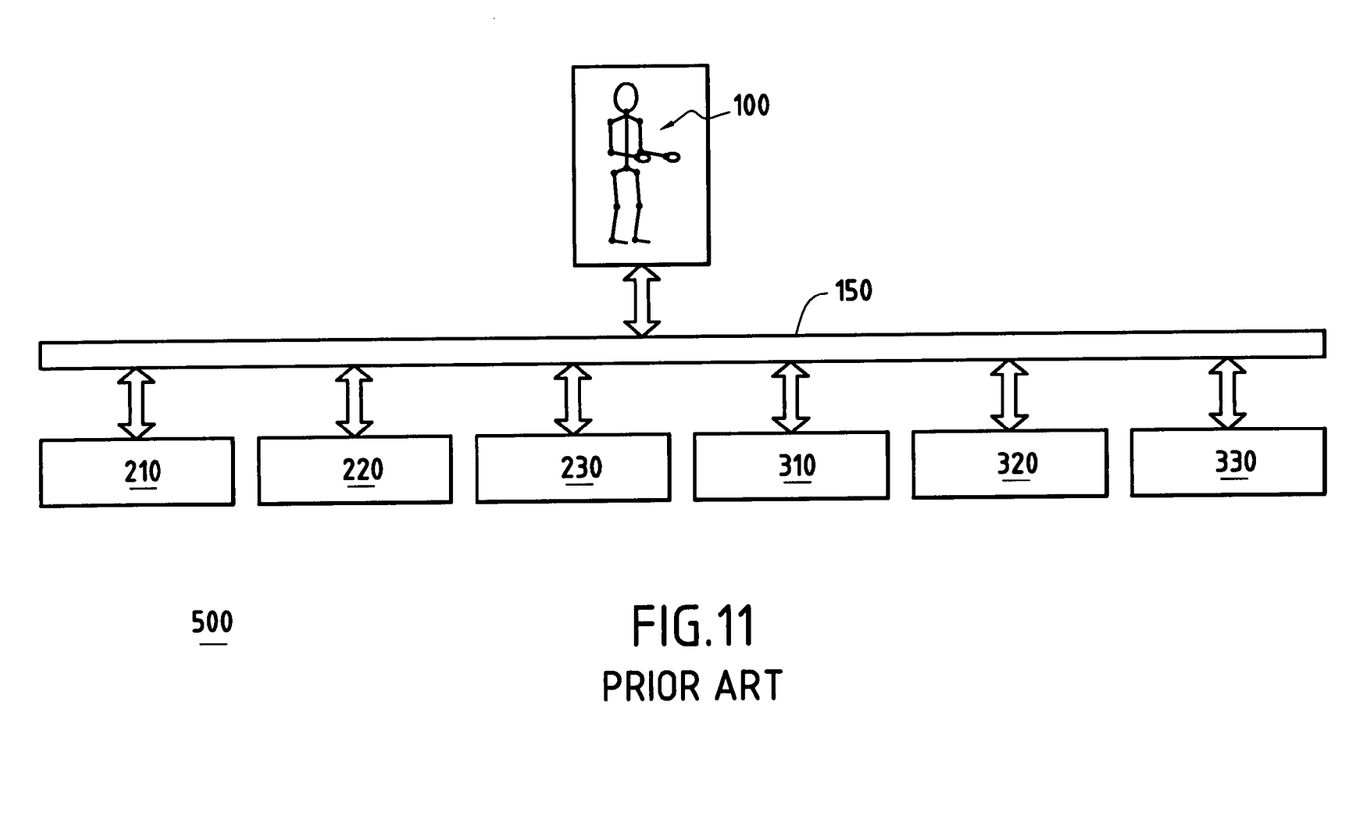
FIG. 11 is a highly diagrammatic view of an architecture for a multi-agent system used in the prior art for moving a dummy.

The principle of the method proposed in the article by Chedmail et al. is based on using a system referred to as "multi-agent" system, as shown in FIG. 11.

The multi-agent system 500 comprises a set of active elements referred to as "agents" 210, 220, 230, 310, 320, and 330, which act on passive objects such as the members and the joints of a virtual dummy 100, while also taking account of its environment.

In that multi-agent system 500, the digital data defining the dummy 100 in its environment constitutes a kind of "blackboard" or "shared data" 150 through which the various agents 210, 220, 230, 310, 320, and 330 interact.

The agents are governed by behavior rules that are simple, but because of the interaction between them, complex collective behavior such as the movement of a dummy can be obtained.

Thus, the process of finding the path followed by the virtual dummy 100 is spread over the various agents 210, 220, 230, 310, 320, and 330 that are capable of acting on the dummy 100 as a function of the environment under consideration. Each agent calculates its own contribution to the overall position of the dummy 100 or to the degrees of freedom of its joints.

FIG. 11 shows a first attraction agent 220 which acts on the overall position of the dummy 100 and a second attraction agent 320 which acts on the plurality of degrees of freedom in the joints of the dummy 100. The purpose of the attraction agents 220 and 320 is to move the dummy 100 towards a well-defined target.

In addition, a first avoider agent 210 acts on the overall position of the dummy 100 and a second avoider agent 310 acts on the plurality of degrees of freedom of the joints of the dummy 100. The avoider agents 220 and 320 act as a function of parameters describing the environment to avoid collisions between the dummy 100 and the environment.

In addition, a first operator agent 230 acts on the overall position of the dummy 100 and a second operator agent 330 acts on the plurality of degrees of freedom of the joints of the dummy 100. The operator agents 230 and 330 enable an operator to act on the path followed by the dummy 100 in real time while the path is being generated.

During movement or manipulation of the dummy, the limits of the joints are normally taken into account. However, it is possible for any posture (within the limits imposed by the joints) to be taken up.

Thus, postures can be generated that are uncomfortable or even dangerous for real work performed by a human (see FIGS. 10A to 10D).

It is always possible to correct such bad postures a posteriori, but to do that it is necessary to proceed by successive approximations, with the resulting posture being evaluated on each occasion in order to obtain postures that are comfortable.

OBJECT AND SUMMARY OF THE INVENTION

The present invention seeks to remedy the above-mentioned drawbacks by proposing a method and a system enabling the movement or the manipulation of a dummy to be simulated while also ensuring that the dummy takes up optimally-comfortable postures.

These objects are achieved by a multi-agent method of moving a virtual dummy in a virtual environment, the dummy being defined by an overall position and by a plurality of degrees of freedom of joints, the method comprising:

a contribution from an attraction agent acting on the plurality of degrees of freedom of the joints of the dummy to move it towards a target; and a contribution from an avoider agent acting on the overall position of the dummy as a function of parameters defining the environment in order to avoid collisions between the dummy and the environment;

the method further comprising a contribution from an ergonomy agent acting on the plurality of degrees of freedom of the joints of the dummy in order to correct the posture of the dummy automatically during its movement towards the target.

Thus, the method of the invention serves to optimize the posture of the dummy automatically, i.e. the posture that is generated is appropriate as soon as it is obtained. There is no longer any need to proceed by successive approximations a posteriori in order to obtain a posture that is comfortable. This makes the method very simple to perform and achieves a significant saving in time.

Advantageously, the method may include a contribution from an attraction agent acting on the overall position of the dummy in order to move it as a whole towards the target.

The method may also include a contribution from an avoider agent acting on the plurality of degrees of freedom of the joints of the dummy as a function of parameters defining the environment in order to facilitate searching for solutions that avoid collisions between the dummy and its environment.

The method may also include a contribution from at least one operator agent acting on the overall position and/or on the plurality of degrees of freedom of the joints of the dummy, enabling an operator to act in real time on the movement of the dummy.

According to a characteristic of the invention, the contribution of the ergonomy agent comprises the following steps:
  determining a posture score vector depending on the degrees of freedom of the joints of the dummy;
  normalizing said posture score vector in order to form a normalized posture score vector;
  weighting said normalized posture score vector in order to form a weighted posture score vector; and
  inverting the sign of said weighted posture score vector so as to determine the contribution of the ergonomy agent.

The step of determining the posture score vector is implemented by transforming a rapid upper limb assessment (RULA) type posture criterion into an algebraic criterion depending on whether each posture score is implemented in the positive direction or the negative direction of the joint.

Advantageously, for each degree of freedom of the joints of the dummy, a score of zero is allocated to an open interval defined about the position in which the algebraic score changes sign, said interval having a range equal to one joint movement pitch predefined for the degree of freedom under consideration.

The normalization step may be implemented by dividing all of the components of the posture score vector by the maximum absolute value of said components.

The weighting step may be implemented by multiplying each component of the normalized posture score vector by the joint movement pitch predefined depending on the type of joint.

In an aspect of the invention, the joint movement pitch is constant for all of the joints.

Advantageously, the joint movement pitch is an angle lying in the range 0.001 rad to 0.1 rad.

According to yet another characteristic of the invention, the attraction agents, the avoider agents, the ergonomy agent, and the operator agents interact in a hierarchical manner through shared digital data defining the dummy and its environment.

The attraction agents, the avoider agents, the ergonomy agent, and the operator agents are organized hierarchically by giving each of them an activity interval that may be steady throughout the movement of the dummy.

According to a particular aspect of the invention, the activity interval of the avoider agents is the shortest and that of the ergonomy agent is the longest.

Advantageously, the activity interval of the avoider agents is an integer in the range 1 or 2, the activity interval of the attraction agents is an integer in the range 2 to 4, the activity interval of the ergonomy agent is an integer in the range 5 to 15, and the activity interval of the operator agents is an integer in the range 2 to 4.

The invention also provides a computer program designed to implement the method having the above characteristics when it is executed by a computer.

The invention also provides a multi-agent system for moving a virtual dummy in a virtual environment, the dummy being defined by an overall position and by a plurality of degrees of freedom for joints, the system comprising:
  an attraction agent for acting on the plurality of degrees of freedom of the joints of the dummy to move the dummy towards a target; and
  an avoider agent for acting on the overall position of the dummy as a function of parameters defining the environment so as to avoid collisions between the dummy and said environment;
  the system further comprising an ergonomy agent for acting on the plurality of degrees of freedom of the joints of the dummy in order to correct the posture of the dummy automatically during its movement towards the target.

BRIEF DESCRIPTION OF THE DRAWINGS

Other features and advantages of the method and the system of the invention will appear better on reading the following description given by way of non-limiting indication and made with reference to the accompanying drawings, in which.

DETAILED DESCRIPTION OF PREFERRED EMBODIMENTS

Figure 1:
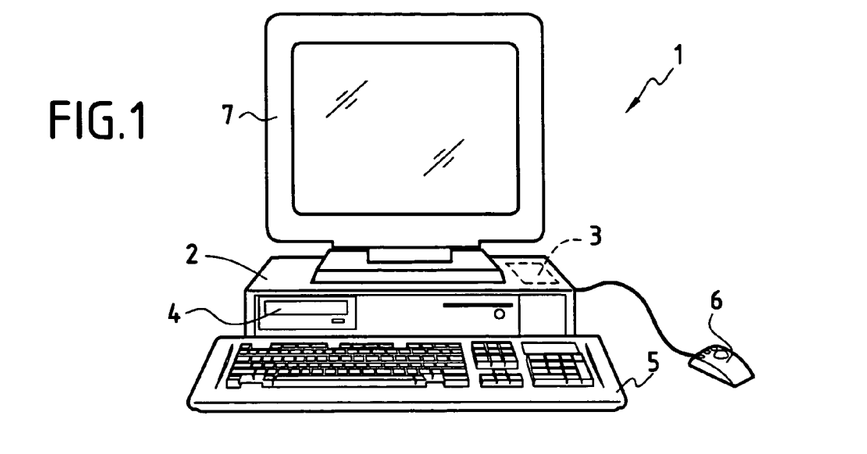
FIG. 1 is a-perspective view of hardware means implemented in the system or the method of the invention.

FIG. 1 shows a system which can be used for modeling the movement of a virtual dummy. The system comprises a workstation or computer 1 having good graphics capacity, used for executing a computer program designed to implement the method of the invention.

The computer 1 includes the hardware means that are normally to be found with this type of appliance. More particularly, the computer comprises a central unit 2 which executes the sequences of instructions of the program implementing the method of the invention, a central memory 3 which stores the data and the programs that are being executed, digital data storage media (hard disk, CD 4, floppy disk, . . . ) for long-term conservation of the data and the programs used, input peripherals (keyboard 5, "2D" or "3D" mouse 6, joystick, . . . ) and output peripherals (screen 7, stereoscopic goggles or headsets, . . . ) in order to be able to view the movement of a virtual dummy.

Naturally, in order to increase calculation capacity, the modeling of the invention may be implemented on a plurality of workstations operating in parallel.

Figure 2:
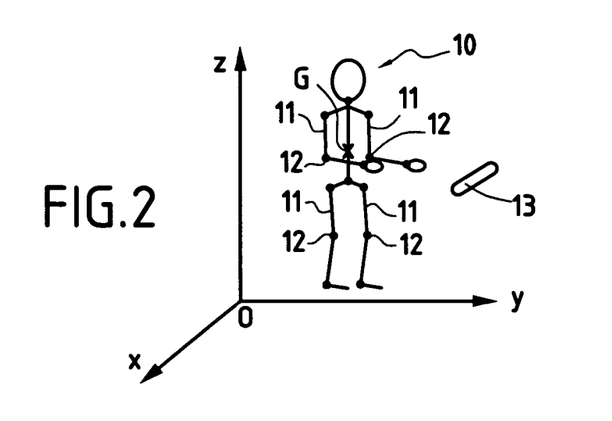
FIG. 2 is a highly diagrammatic illustration of a dummy defined in a metric space in accordance with the invention.

FIG. 2 is a highly diagrammatic view of a virtual dummy 10 in stick-figure form, being defined by a set of "passive objects", i.e. members 11 interconnected by joints 12. The dummy 10 acts in a virtual environment characterized by a certain number of objects, including a target 13 that is to be reached. The dummy 10 and its environment are defined in a metric space (O; x, y, z).

This metric space makes it simple to identify the position and the orientation of each member 11 of the dummy 10 and also of the target 13 that is to be reached. The position of any object can be identified by a data set made up of three Cartesian coordinates along the axes x, y, and z, and the orientation of the object can be identified in known manner by three angles defined relative to the same three axes x, y, z.

At each instant, the dummy 10 can be defined by values for the internal degrees of freedom of its joints 12 and by its overall position. By way of example, the overall position of the dummy is defined as the position of its center of gravity G, and also by the orientation of the dummy about the vertical, i.e. about the z axis. Naturally, account must also be taken of parameters or constraints that are imposed by the limit positions of the joints and by the physical connections between the various members 11 of the dummy 10.

All this data and the variables defining the dummy 10, together with the parameters defining its environment are stored in the digital data medium 3 of the computer system 1.

Figure 3:
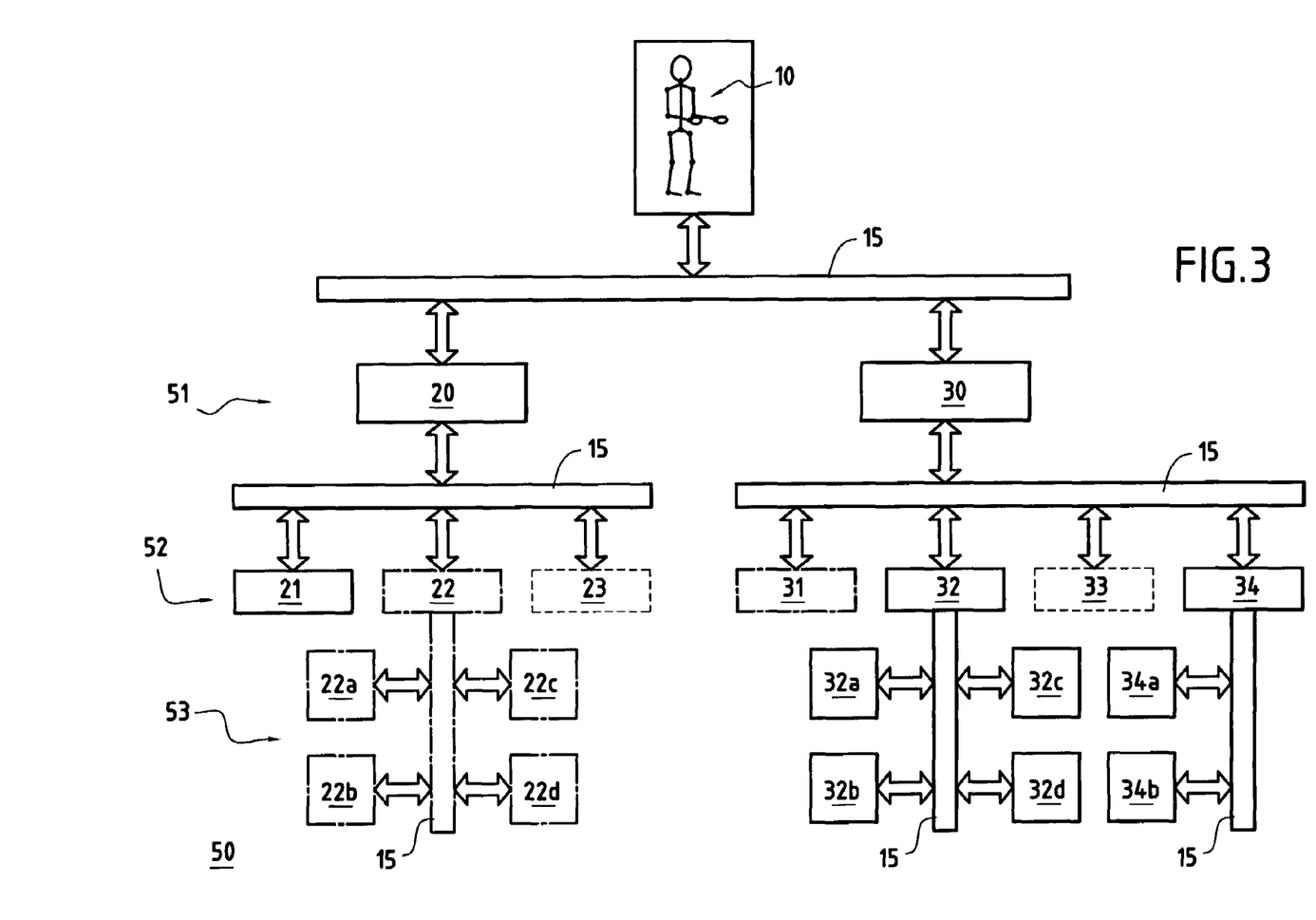
FIG. 3 shows in highly diagrammatic manner an architecture for a multi-agent system used for moving a dummy in accordance with the invention.

FIG. 3 shows very diagrammatically an architecture suitable for a multi-agent system 50 of the invention, which is used for modeling the movement of the virtual dummy 10. This multi-agent system 50 is made up of a set of active elements or "agents" 20, 21, 22, 23, 30, 31, 32, 33, and 34 which act on the passive objects (members 11 and joints 12) making up the dummy 10 as a function of its environment.

The data or variables defining the dummy 10 and its environment constitute shared data 15 through which the various agents interact.

The architecture of the multi-agent system may be organized in a plurality of stages or levels, in pyramid manner, so that the base agents contribute to the actions of agents at a higher level.

In this example, the multi-agent system 50 presents a first level 51, a second level 52, and a third level 53.

The first level 51 illustrates the overall contribution or action on the dummy 10 and includes the contribution of a first overall agent 20 and the contribution of a second overall agent 30 acting on the dummy 10 via the shared data 15.

The first overall agent 20 acts on the overall position of the dummy 10 and the second overall agent 30 acts on the internal degrees of freedom of the joints 12 of the dummy 10.

The second level 52 illustrates the various contributions coming from the various types of agent which generate the contributions of the first and second overall agents 20 and 30 by interacting through the shared data 15.

In order to enable the dummy 10 to move without colliding in its environment while also occupying postures that are comfortable, it suffices for the second level 52 of the multi-agent system 50 to include at least one attraction agent, at least one avoider agent, and at least one ergonomy agent.

Thus, the second level 52 of the multi-agent system 50 may include an avoider agent 21 (drawn in continuous lines) acting on the overall position of the dummy 10, an attraction agent 32 (drawn in continuous lines) acting on the internal degrees of freedom of the joints 12 of the dummy 10, and an ergonomy agent 34 (drawn in continuous lines) also acting on the internal degrees of freedom of the joints 12 of the dummy 10.

In this case, the avoider agent 21 is in fact part of the first overall agent 20, since it is the only agent to act on the overall position of the dummy 10.

The avoider agent 21 acts in overall manner on the dummy to cause it to slide and/or turn in its environment so as to avoid collisions. In contrast, the attraction agent 32 acts on the joints of the dummy, e.g. in order to cause its hands to reach the target.

In addition, in order to move the dummy 10 towards its target 13 in overall manner, e.g. by causing the legs of the dummy 10 to slide over the ground in its environment, the second level 52 of the multi-agent system 50 may include an attraction agent 22 (drawn in chain-dotted lines) acting on the overall position of the dummy 10.

In addition, in order to improve or facilitate the search for solutions that avoid collisions between the dummy 10 and its environment, the second level 52 of the multi-agent system 50 may include an avoider agent 31 (drawn in chain-dotted lines) acting on the internal degrees of freedom of the joints 12 of the dummy 10.

Optionally, the second level 52 of the multi-agent system 50 may include at least one operator agent 23, 33 (drawn in dashed lines) acting on the overall position of the dummy 10 and/or on the internal degrees of freedom of its joints 12.

By way of example, the third level 53 provides a few local agents giving elementary contributions to some of the agents in the second level 52, still through the shared data 15.

The contribution of the attraction agent 22 acting on the overall position of the dummy 10 may, for example, include a contribution from a left hand attraction agent 22a, a contribution from a right hand attraction agent 22b, a contribution from an orientation attraction agent 22c, and other contributions from attraction agents identified by reference 22d.

The contribution of the attraction agent 32 acting on the internal degrees of freedom of the joints 12 of the dummy 10 may comprise, for example, a contribution from a left wrist attraction agent 32a, a contribution from a right wrist attraction agent 32b, a contribution from a torso attraction agent 32c, and contributions from other attraction agents identified by reference 32d.

The contribution of the ergonomy agent 34 comprises a contribution from a posture-improving agent 34a and possibly other contributions from ergonomy agents identified by reference 34b.

Thus, each elementary agent possesses a determined function and has available only a partial representation of the dummy 10 and its environment, but can act on the dummy 10 by calculating a contribution to the overall position of the dummy 10 and/or to the internal degrees of freedom of its joints 12 by taking account of the resources and abilities made available to it and as a function of the objective it is to accomplish.

In addition, the action or contribution of each agent is weighted, or in other words is limited by a norm in terms of a linear or angular movement pitch for the overall position of the dummy 10 or in terms of an angular pitch for its joints 12. These pitches are predefined so as to implement small elementary movements. For example, the linear movement pitch may lie in the range 1 millimeter (mm) to 10 centimeters (cm).

In addition, the various agents interact in a hierarchical manner through the shared digital data 15. The relative priority of each contribution is given by the frequency with which the agent calculates and integrates its contribution to the overall contribution to movement of the dummy 10. This frequency is defined relative to the clock rate of pulses governing the calculation steps of the various agents.

In other words, the action of each agent is subjected to a predetermined activity interval, corresponding to the reciprocal of its intervention frequency.

For example, since collision avoidance is the main objective in modeling accessibility to an article in a congested environment, the corresponding agents have the highest frequency, i.e. the shortest activity interval.

Thus, an agent having the highest frequency, i.e. an activity interval equal to 1 will act on every calculation step or pulse.

An attraction agent 21, 31 is intended to cause the dummy 10 to reach its target 13 (or possibly its targets), so it takes account only of the position and the orientation of the target together with the members 11 or joints 12 of the dummy 10 on which it acts. It does not care about the dimensions of the article to be manipulated or any other information.

An avoider agent 22, 32 acts to cause the dummy 10 to slide in its environment so as to avoid collisions. A collision may be characterized, in conventional manner, by recognizing a collision line between two virtual articles. Under such circumstances, the contribution of the avoider agent 22, 32 is defined as a function of the gradient of the length of said collision line.

Thus, the various contributions of the avoider agents 22, 32 and attraction agents 21, 31 acting on the overall position or on the plurality of degrees of freedom of the joints 12 of the dummy 10 can cause the dummy 10 to move in order to reach a target 13, while also ensuring that the dummy avoids collisions with its environment.

In addition, the multi-agent system may include an operator agent 23 and 33 acting on the overall position and/or on the plurality of degrees of freedom of the joints 12 of the dummy 10 in order to enable an operator to act in real time on the movement of the dummy 10. An activity interval may also be given to the operator agents.

An operator agent 23, 33 enables an operator to act on the path followed by the dummy while the path is being generated in order to include in that path the operator's overall view of the scene or the operator's own experience. The operator can thus encourage a particular direction of movement for a hand of the dummy 10 or for its body as a whole, or the operator can control directly the internal degrees of freedom of the joints 12 of the dummy 10, by giving them a reference direction.

Nevertheless, during the movements of the dummy 10, it is still possible for the dummy to take up postures that would be dangerous for a human being undertaking real work.

By means of the intervention of the ergonomy agent 34, the ergonomy of the dummy 10 is optimized along the path followed by the dummy.

The contribution of the ergonomy agent 34 is defined by a vector or table of posture scores. Several methods can be used for evaluating such posture scores.

By way of example, the article by McAttamey et al. entitled "RULA: A survey method for the investigation of work-related upper-limb disorders" (Applied Ergonomics, Vol. 24, No. 2, Apr. 1993, pp. 91-99) relating to a method of evaluating work-related risk factors in musculo-skeletal disorders can be used to evaluate posture in the neck, the trunk, and the upper limbs by means of a scoring system. The scoring system enables a list of interventions to be drawn up for reducing the risk of lesions that result from a human being taken up bad postures.

FIGS. 4A to 6E give examples of posture scores for the arm, the forearm, and the wrist, based on a posture scoring system using the "RULA" method or technique. These figures show that a sign is given to each RULA score, all of which scores begin by being positive.

In general, the RULA technique causes a positive integer to correspond to the amplitude of the movement of each member of the dummy so that the greater the danger of the posture, the greater the magnitude of the associated number. Thus, a score of 1 corresponds to movement amplitude for a comfortable posture whereas a score of 4 corresponds to movement amplitude for a dangerous posture.

The objective of the ergonomy agent 34 is to minimize a posture discomfort criterion throughout the path followed by the dummy 10. Its function is to take account of the posture discomfort constraints while generating the path, instead of doing so during a posteriori analysis of the path as is done conventionally.

In order to be able to define the ergonomy agent by using a RULA type posture criterion, the criterion is transformed into an algebraic criterion in which each posture score is given in the positive or the negative direction of the joint. The positive direction may be predefined in arbitrary manner, however the same definition must naturally be maintained throughout the path followed by the dummy 10. The positive direction must be the same for all of the other agents acting on the degrees of freedom of the dummy.

For example, when the score is made in the positive direction of the joint, it is given a "+" sign, and when it is made in the negative direction, it is given a "−" sign.

Figure 4A:
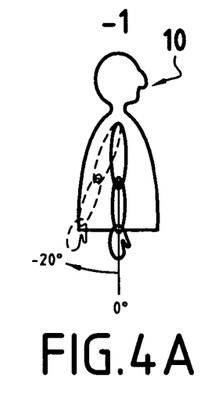
FIGS. 4A to 4F are diagrams giving RULA type postural scores for the arms in accordance with the invention.
Figure 4B:
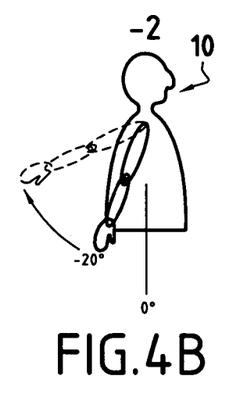
Figure 4C:
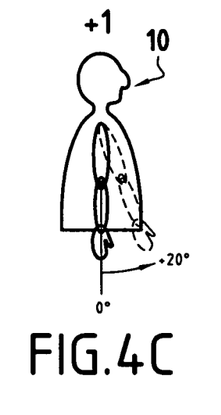
Figure 4D:
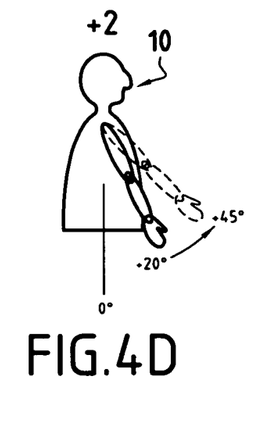
Figure 4E:
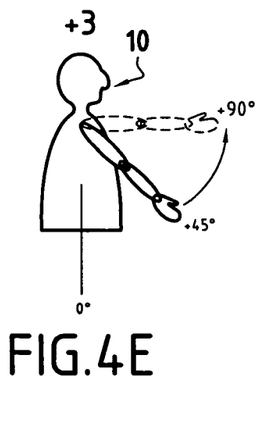
Figure 4F:
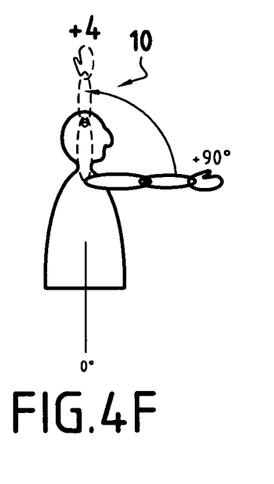

FIGS. 4A to 4F constitute diagrams giving posture scores for the arm. The example of FIG. 4A shows an arm swinging backwards through an angle of 0° to −20° relative to the trunk of the dummy 10 and shows that this has a posture score of −1. In FIG. 4B, the arm is moved further backwards through an angle that is more negative than −20° (e.g. −30°), giving a posture score of −2. FIG. 4C shows an arm swinging forwards through an angle in the range 0° to −20°, presenting a posture score of +1. FIG. 4D shows that an arm swung forwards to an angle in the range +20° to +45° presents a posture score of +2. FIG. 4E shows that an arm extending forwards at an angle in the range +45° to +90° has a posture score of +3. Finally, FIG. 4F shows that an arm swung forwards through an angle of more than +90° presents a posture score of +4.

FIGS. 5A to 5D give posture scores for the forearm. A forearm at an angle lying in the range 0° to +60° relative to the upper arm presents a posture score of +2 (FIG. 5A), a forearm at an angle lying in the range +60° to +80° presents a posture score of +1 (FIG. 5B), a forearm at an angle lying in the range +80° to +100° presents a posture score of −1

Figure 5A:
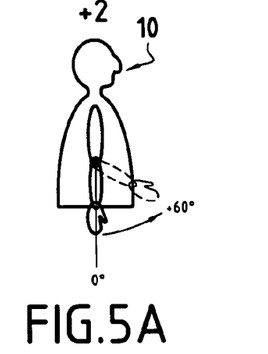
FIGS. 5A to 5D are diagrams giving RULA type postural scores for the forearm in accordance with the invention.
Figure 5B:
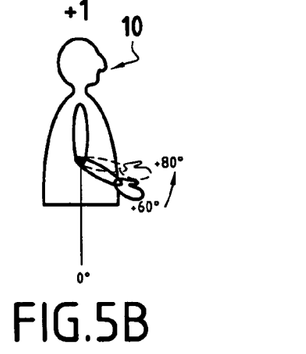
Figure 5C:
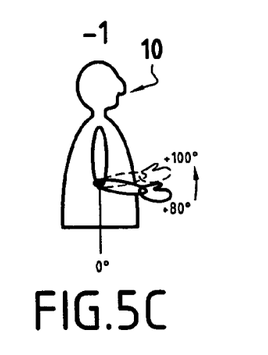
Figure 5D:
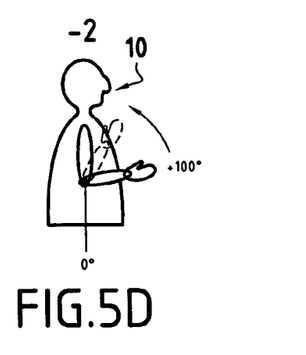

(FIG. 5C), and finally a forearm at an angle of more than +100° presents a posture score of −2 (FIG. 5D).

Figure 6A:
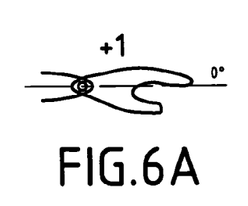
FIGS. 6A to 6E are diagrams giving RULA type postural scores for the wrist in accordance with the invention.
Figure 6B:
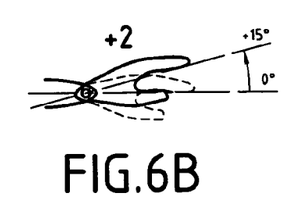
Figure 6C:
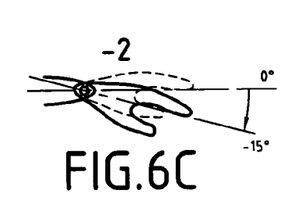
Figure 6D:
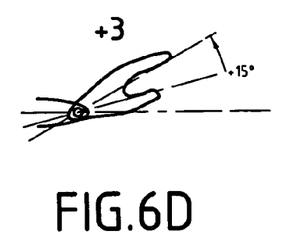
Figure 6E:
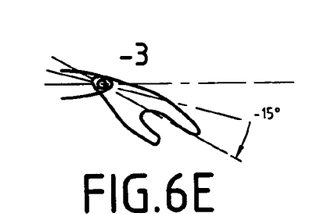

FIGS. 6A to 6E give posture scores for the wrist of the dummy 10. A wrist in alignment with the forearm, i.e. at an angle of 0° relative to the forearm presents a posture score of +1 (FIG. 6A), a wrist at an angle in the range 0° to +15° relative to the forearm presents a posture score of +2 (FIG. 6B), a wrist with an angle lying in the range 0° to −15° presents a posture score of −2 (FIG. 6C), a wrist at an angle of greater than +15° presents a posture score of +3 (FIG. 6D), and finally a wrist at an angle of less than −15° presents a posture score of −3 (FIG. 6E).

Nevertheless, the RULA method is restricted to main degrees of freedom, and certain degrees of freedom do not have any associated score. Consequently, for degrees of freedom which do not have a specific RULA score (e.g. the collarbone joint), the method of the invention gives a score of +1, 0, or −1 depending on the movement of the joint. Posture comfort can thus be estimated with very great accuracy.

In addition, for each degree of freedom of a joint 12 of the dummy 10, and in order to avoid oscillations of the joint about a position in which its algebraic score changes sign, a score of zero is allocated to an open interval about such a position, and the radius of this interval is equal to the joint movement pitch predefined for the degree of freedom in question.

Thus, the method and the system of the invention make it possible to draw up a table or vector of algebraic posture scores for all of the degrees of freedom of all of the joints of the dummy and at all times. The vector can be built up as explained above using the RULA technique or using any other posture-scoring technique.

Thereafter, the vector is normalized using any of the normalization applications that define the same topology.

By way of example, normalization is performed using an infinite norm. This is implemented by dividing all of the posture score vector components by the maximum absolute value of the components in order to obtain a vector of norm 1 in the infinite norm meaning. This normalization conserves the relative size of the algebraic RULA score constituted for each joint 12 of the dummy 10.

Thereafter the normalized posture score vector is weighted by the joint movement pitch(es) of the dummy 10.

It is possible for the joint movement pitch to be predefined as a function of the type of joint. For example, a joint pitch can be given to the elbow which is different from that given to the wrist. Under such circumstances, each component of the normalized posture score vector is multiplied by the corresponding joint movement pitch so as to form a weighted posture score vector.

It is also possible to envisage that the joint movement pitch is constant for all of the joints 12. Under such circumstances, it suffices to multiply the normalized posture score vector by the constant joint movement pitch in order to form a weighted posture score vector.

Naturally, it is possible to select a joint movement pitch that is as small as possible, given the available digital calculation power. A small movement pitch increases the fineness of movement for the joints 12 but also increases calculation time.

Thus, a joint movement pitch corresponding to an angle lying in the range 0.001 rad to 0.1 rad gives a good compromise between speed of calculation and optimizing modeling of the movements of the dummy.

Finally, the contribution of the ergonomy agent is determined by inverting the sign of the weighted posture score vector. In other words, the contribution of the ergonomy agent is a vector made up of the opposites of the posture scores for each of the joints. Thus, a joint is moved in the positive direction if its score is negative, and vice versa. This enables the posture score of a joint to be minimized using correction that is proportional to the value of the score, i.e. the greater the absolute value of the posture score of a joint, the greater the posture correction contribution for said joint in the overall contribution.

By way of example, consider a dummy whose arm is at a posture amplitude corresponding to an angle of 90° (π/2 rad), the forearm at an angle of 30° (π/6 rad) and the wrist at an angle of −20° (−π/9 rad). From the posture scores given in FIGS. 4A to 6E, the algebraic RULA score vector for the arm, the forearm, and the wrist is given by (+4; +2; −3).

The normalized vector is then given by. (1; ½; −¾), and when the joint movement pitch is equal to 0.01 rad, for example, the weighted normalized posture score vector is of the form (0.01; 0.005; −0.00075), and consequently the contribution of the ergonomy agent is given by the vector (−0.01; −0.005; +0.00075). This example shows that the ergonomy agent acts more quickly on those joints for which the postures are the least comfortable.

Figure 7A:
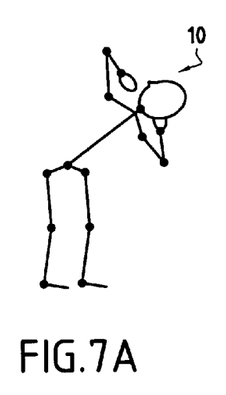
FIGS. 7A to 7D are stick-figure diagrams showing a sequence for correcting the posture of a dummy solely under the action of an ergonomy agent in accordance with the invention.
Figure 7B:
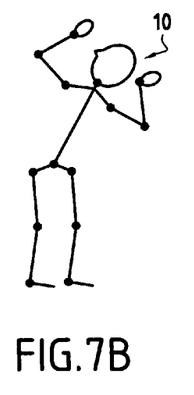
Figure 7C:
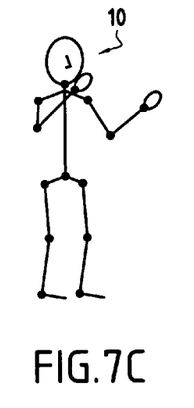
Figure 7D:
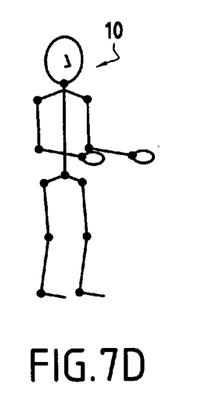

FIGS. 7A to 7D show a sequence for correcting the posture of a dummy 10 under the action of the ergonomy agent acting alone, i.e. without any contribution from the attraction or avoider agents. FIG. 7A shows a starting position that is very uncomfortable, or even dangerous, in which case the back presents a posture score of 6. FIG. 7B shows that this initial posture of the back is corrected very quickly. Finally, passing sequentially via FIG. 6C, the ergonomy agent reaches a posture that is comfortable (FIG. 7D) in which the RULA score is the smallest.

In accordance with the invention, the contribution of the ergonomy agent 34 is calculated and included automatically in the overall contribution for the dummy 10 at a frequency which is determined by the activity interval allocated to the ergonomy agent 34.

Given that optimizing posture is an objective of lower priority than avoiding collisions, or than attracting the hands of the dummy towards the target, for example, the ergonomy agent 34 has a long activity interval, i.e. a low frequency.

In general, the activity intervals of the avoider agents are the shortest and that of the ergonomy agent is the longest. By way of example, the activity interval of an avoider agent may be selected to be equal to 1 or 2, the activity interval of the attraction agent may be an integer lying in the range 2 to 4, the activity interval of the operator agent may be an integer lying in the range 2 to 4, and the activity interval of the ergonomy agent may be an integer in the range 5 to 15.

Thus, when the activity interval of the ergonomy agent 34 is equal to ten, the contribution of this agent is calculated and applied automatically to the dummy 10 once every ten calculation steps.

Figure 8:
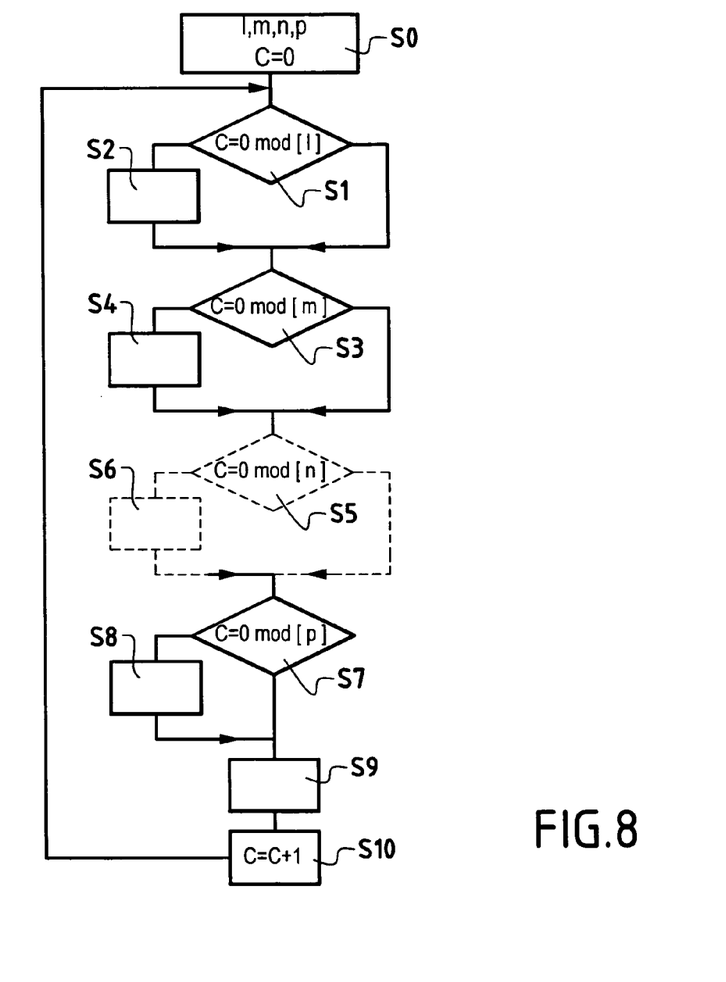
FIG. 8 is a flow chart showing the main steps of a multi-agent method of the invention.

In accordance with the invention, FIG. 8 is a flow chart showing the main steps of a digital multi-agent method modeling the movement of a virtual dummy 10 in a virtual environment (see also the preceding figures).

Step S0 is a step of initializing the flow chart in which various parameters are defined. For example, a counter "C" for clocking calculation steps or pulses for the model is initialized (i.e. C=0).

The relative priority of the agent may be predefined in step S0, given that these agents share the same digital data and interact between one another in a hierarchical manner.

Each agent is then given an activity interval that is expressed as a non-zero integer representative of the reciprocal of its frequency of action. The activity interval of each agent can vary while the movement of the dummy 10 is being modelled, e.g. as a function of the congestion of the environment or of the distance to the target that is to be reached.

In this example, for reasons of simplicity, the attraction agents 22, 32, the avoider agents 21, 31, the operator agents 23, 33, and the ergonomy agent 34 are in a hierarchy where each of them is given an activity interval that remains unchanged throughout the movement of the dummy 10. Thus, integers l, m, n, and p are given for defining the activity intervals of the attraction agents 22, 23, the avoider agents 21, 31, the operator agents 23, 33, and the ergonomy agent 34, respectively.

Similarly, the linear movement pitch and the orientation pitch of the dummy about the vertical, and also the joint pitches, can be likewise defined in step S0. It is possible to select a variable pitch for a given joint 12, e.g. a pitch that varies as a function of the distance between the dummy 10 and the target 13. It is also possible to give pitches that are different depending on the nature of the joint 12. It is also possible to select a constant pitch that is optimized for all of the joints 12 and for the entire path followed by the dummy 10.

Step S1 is a test indicating whether the value of the counter is a multiple of l, in other words whether the counter is equal to zero modulo l (C=0 mod l)

If so, the contribution of the attraction agent 22, 32 is calculated in step S2 prior to moving onto the following step S3. For example, if l=3, the contribution of the attraction agent acts once every three clock pulses, i.e. whenever the counter is equal to 3, 6, 9, etc.

Otherwise, the method moves directly onto the test of step S3 which indicates whether the value of the counter is a multiple of m (C=0 mod m).

If so, the contribution of the avoider agents 21, 31 is calculated in step S4 prior to moving onto the next step S5.

Otherwise, the method moves on directly to the test of step S5 which indicates whether the value of the counter is a multiple of n (C=0 mod n).

If so, the contribution of the operator agents 23, 33 is calculated in step S6 prior to moving onto the following step S7 (steps S5 and S6 are optional).

Otherwise, the method moves on directly to the test of step S7 which indicates whether the value of the counter is a multiple of n (C=0 mod p).

If so, the contribution of the ergonomy agent 34 is calculated in step S8 depending on the vector made up of the negatives of the posture scores for each of the joints, prior to moving onto the following step S9. In this example, the posture of the dummy is corrected automatically once very p calculation steps.

If the value of the counter in step S7 is not a multiple of p, then the method moves on directly to step S9 in which the overall contribution is applied to the dummy 10 in order to move it or manipulate it as a function of the results of the calculations in the preceding steps.

In step S10, the counter is incremented (C=C+1) prior to looping back to step S1.

Thus, the multi-agent system of the invention comprises at least one attraction agent 22, 32, at least one avoider agent 21, 31, optionally at least one operator agent 23, 33, and at least one ergonomy agent 34 serving to act automatically to optimize the ergonomy of the dummy 10 as it follows its path.

FIGS. 9A to 9D are a sequence showing the movement of a dummy 10 with a contribution from the ergonomy agent, starting from an initial position (FIG. 9A) and going to a final position (FIG. 9D) in which the hands of the dummy 10 reach their target which is constituted by two handles 13a, 13b.

Figure 9A:
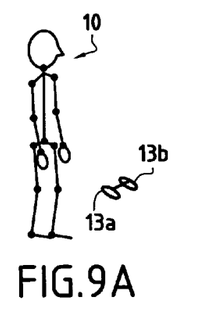
FIGS. 9A to 9D are stick-figure diagrams showing a movement sequence of a dummy under the action of a multi-agent system including an ergonomy agent in accordance with the invention.
Figure 9B:
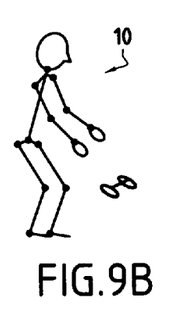
Figure 9C:
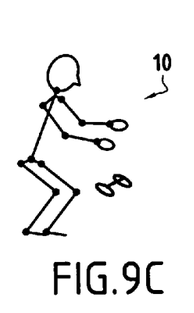
Figure 9D:
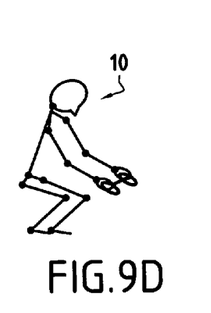
Figure 10A:
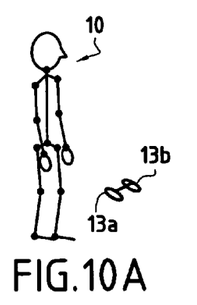
FIGS. 10A to 10D are stick-figure diagrams showing a movement sequence of a dummy under the action of a multi-agent system of the prior art without an ergonomy agent.
Figure 10B:
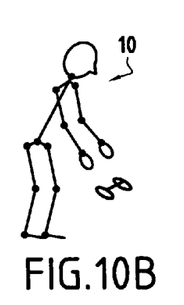
Figure 10C:
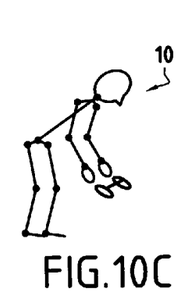
Figure 10D:
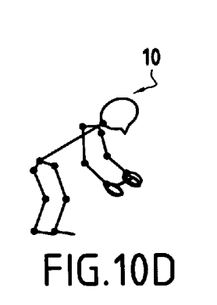

In contrast, FIGS. 10A to 10D are a sequence showing the movement of a dummy 10 without any contribution from the ergonomy agent, starting from the same initial position (FIG. 10A) and going to a final position (FIG. 10D) that is less comfortable than the final position of FIG. 9D, but in which the hands of the dummy 10 likewise reach the two handles 13a, 13b.

The optimization of ergonomy in FIGS. 9A to 9D leads to changes to the internal degrees of freedom of the dummy 10 so as to improve the comfort of posture continuously throughout the path followed by the dummy.

These changes to the internal degrees of freedom thus have an effect on the overall position of the dummy 10 via the attraction agents. FIGS. 9B to 9D show, in comparison with FIGS. 10B to 10D, that the comfortable postures taken by the dummy 10 due to optimization of ergonomy serve to move the hands of the dummy 10 away from their respective targets 13a and 13b, with this being compensated by overall attraction of the dummy 10 towards the targets 13a, 13b.

What is claimed is:

1. A multi-agent method for moving a virtual dummy in a virtual environment to simulate human actions in a defined environment for validating and optimizing accessibility to certain parts of a machine, the dummy being defined by an overall position and by a plurality of degrees of freedom for joints, the method comprising:

a step of moving the dummy towards a target by means of an attraction agent acting on the plurality of degrees of freedom of the joints of the dummy; and a step of avoiding collisions between the dummy and the environment by means of an avoider agent acting on the overall position of the dummy as a function of parameters defining said environment;

a step of automatically correcting the posture of the dummy during its movement towards the target by means of an ergonomy agent acting on the plurality of degrees of freedom for the joints of the dummy, wherein said correcting comprises the following steps:

determining a posture score vector depending on the degrees of freedom of the joints of the dummy;

normalizing said posture score vector in order to form a normalized posture score vector;

weighting said normalized posture score vector in order to form a weighted posture score vector; and inverting the sign of said weighted posture score vector so as to determine the contribution of the ergonomy agent.

2. A method according to claim 1, further including a step of overall movement towards the target by means of an attraction agent acting on the overall position of the dummy.

3. A method according to claim 1, wherein, for each degree of freedom of the joints of the dummy, a score of zero is allocated to an open interval defined about the position in which the algebraic score changes sign, said interval having a range equal to one joint movement pitch predefined for the degree of freedom under consideration.

4. A method according to claim 1, wherein the said normalizing is implemented by dividing all of the components of the posture score vector by the maximum absolute value of said components.

5. A method according to claim 1, wherein the weighting step is implemented by multiplying each component of the normalized posture score vector by the joint movement pitch predefined depending on the type of joint.

6. A method according to claim 5, wherein the joint movement pitch is constant for all of the joints.

7. A method according to claim 5, wherein the joint movement pitch is an angle lying in the range 0.001 rad to 0.1 rad.

8. A method according to claim 1, wherein the step of determining the posture score vector is implemented by transforming a RULA type posture criterion into an algebraic criterion depending on whether each posture score is implemented in the positive direction or the negative direction of the joint.

9. A method according to claim 1, further including an additional step of avoiding collisions between the dummy and the environment by means of an avoider agent acting on the plurality of degrees of freedom of the joints of the dummy as a function of parameters defining said environment.

10. A method according to claim 1, further including a step of an operator moving the dummy in real time by means of at least one operator agent acting on the overall position and/or on the plurality of degrees of freedom of the joints of the dummy.

11. A method according to claim 1, wherein the attraction agents, the avoider agents, the ergonomy agent, and the operator agents interact in a hierarchical manner through shared digital data defining the dummy and its environment.

12. A method according to claim 11, wherein the attraction agents, the avoider agents, the ergonomy agent, and the operator agents are organized hierarchically by giving each of them an activity interval that is steady throughout the movement of the dummy.

13. A method according to claim 12, wherein the activity interval of the avoider agents is the shortest and that of the ergonomy agent is the longest.

14. A method according to claim 12, wherein the activity interval of the avoider agents is an integer in the range 1 or 2, the activity interval of the attraction agents is an integer in the range 2 to 4, the activity interval of the ergonomy agent is an integer in the range 5 to 15, and the activity interval of the operator agents is an integer in the range 2 to 4.

15. A multi-agent system for moving a virtual dummy in a virtual environment to simulate human actions in a defined environment for validating and optimizing accessibility to certain parts of a machine, the dummy being defined by an overall position and by a plurality of degrees of freedom for joints, the system comprising:
   an attraction agent for acting on the plurality of degrees of freedom of the joints of the dummy to move the dummy towards a target; and
   an avoider agent for acting on the overall position of the dummy as a function of parameters defining the environment so as to avoid collisions between the dummy and said environment; and
   an ergonomy agent for acting on the plurality of degrees of freedom of the joints of the dummy in order to correct the posture of the dummy automatically during its movement towards the target, the ergonomy agent comprising a vector whose components are defined by the negative of the weighted posture scores of the joints.

16. A system according to claim 15, wherein the posture scores are based on an algebraic criterion of a RULA type posture system.

17. A system according to claim 15, wherein each degree of freedom of the plurality of degrees of freedom of the joint is defined by an angular movement pitch lying in the range 0.001 rad to 0.1 rad.

18. A system according to claim 15, further comprising an attraction agent for acting on the overall position of the dummy in order to move it in overall manner towards the target.

19. A system according to claim 15, further comprising an avoider agent for acting on the plurality of degrees of freedom of the joints of the dummy as a function of parameters defining the environment so as to avoid collisions between the dummy and said environment.

20. A system according to claim 15, further comprising at least one operator agent for acting on the overall position and/or on the plurality of degrees of freedom of the joints of the dummy in order to enable an operator to act in real time on the movement of the dummy.

21. A system according to claim 15, wherein the attraction agents, the avoider agents, the ergonomy agent, and the operator agents are designed to interact in hierarchical manner through shared digital data defining the dummy and its environment.

22. A computer program, designed to implement the method according to claim 1 when executed on a computer.

23. A method according to claim 1, wherein said virtual environment corresponds to the machine and said virtual dummy corresponds to an individual accessing said machine.

24. A method according to claim 23, wherein said machine is an airplane engine.

25. A method according to claim 23, further including a step of displaying the movements of said dummy on a screen thereby enabling monitoring of an access of said machine by said individual.

26. A system according to claim 15, wherein said virtual environment corresponds to said machine and said virtual dummy corresponds to an individual accessing said machine.

27. A system according to claim 26, wherein said machine is an airplane engine.

28. A system according to claim 26, further comprising a screen configured to display the movements of the virtual dummy thereby enabling monitoring an access of said machine by said individual.

* * * * *